(12) United States Patent
Bäck

(10) Patent No.: US 8,919,824 B2
(45) Date of Patent: Dec. 30, 2014

(54) THREADED THIN-WALLED DRILL TUBE JOINT

(75) Inventor: Göran Bäck, Nora (SE)

(73) Assignee: Sandvik Intellectual Property AB, Sandviken (SE)

( * ) Notice: Subject to any disclaimer, the term of this patent is extended or adjusted under 35 U.S.C. 154(b) by 644 days.

(21) Appl. No.: 13/258,749

(22) PCT Filed: Feb. 16, 2010

(86) PCT No.: PCT/SE2010/050173
§ 371 (c)(1),
(2), (4) Date: Oct. 4, 2011

(87) PCT Pub. No.: WO2010/110720
PCT Pub. Date: Sep. 30, 2010

(65) Prior Publication Data
US 2012/0013123 A1    Jan. 19, 2012

(30) Foreign Application Priority Data

Mar. 26, 2009    (SE) .................................... 0900388

(51) Int. Cl.
*F16L 25/00*    (2006.01)
*E21B 17/042*    (2006.01)
*F16L 15/00*    (2006.01)

(52) U.S. Cl.
CPC ........... *E21B 17/0426* (2013.01); *F16L 15/006* (2013.01)

USPC .......................................... 285/334; 285/390

(58) Field of Classification Search
CPC ........ F16L 15/001; F16L 15/06; F16L 15/004
USPC .................. 285/333, 334, 355, 390
See application file for complete search history.

(56) References Cited

U.S. PATENT DOCUMENTS

| | | | | |
|---|---|---|---|---|
| 2,893,759 | A * | 7/1959 | Blose | 285/334 |
| 3,468,563 | A * | 9/1969 | Duret | 285/93 |
| 4,429,904 | A * | 2/1984 | Reimert | 285/24 |
| 5,788,401 | A | 8/1998 | Drenth | |
| 6,412,831 | B1 | 7/2002 | Noel et al. | |
| 2003/0144158 | A1 | 7/2003 | Petelot | |
| 2004/0195835 | A1* | 10/2004 | Noel et al. | 285/333 |

FOREIGN PATENT DOCUMENTS

FR    2 813 375 A1    3/2002

* cited by examiner

*Primary Examiner* — Aaron Dunwoody
(74) *Attorney, Agent, or Firm* — Morgan, Lewis & Bockius LLP

(57) ABSTRACT

A member of a joint for a thin-walled drill tube presents a central axis and has a thread for forming a screw joint. The thread presents a thread bottom, a thread top, a pressure flank and a clearance flank. The pressure flank presents a portion having a negative angle less than 7.5°, but at least 0°, relative to a direction perpendicular to the central axis.

23 Claims, 3 Drawing Sheets

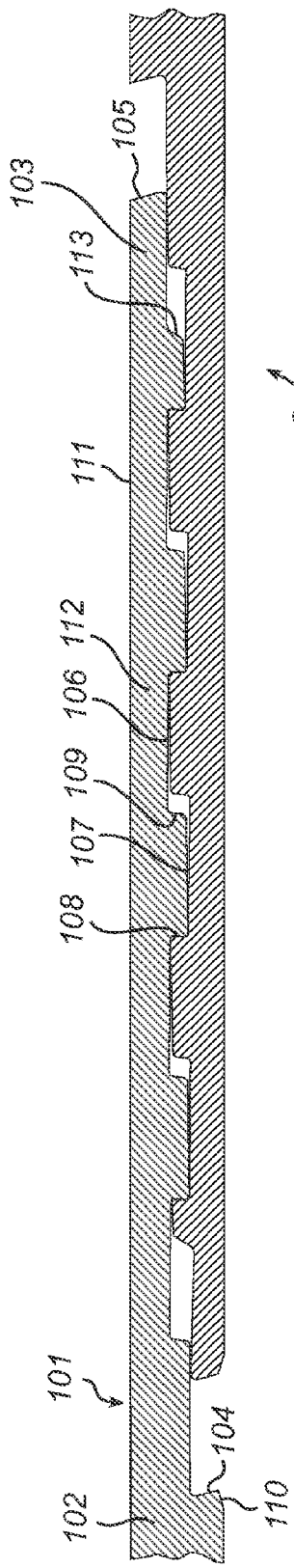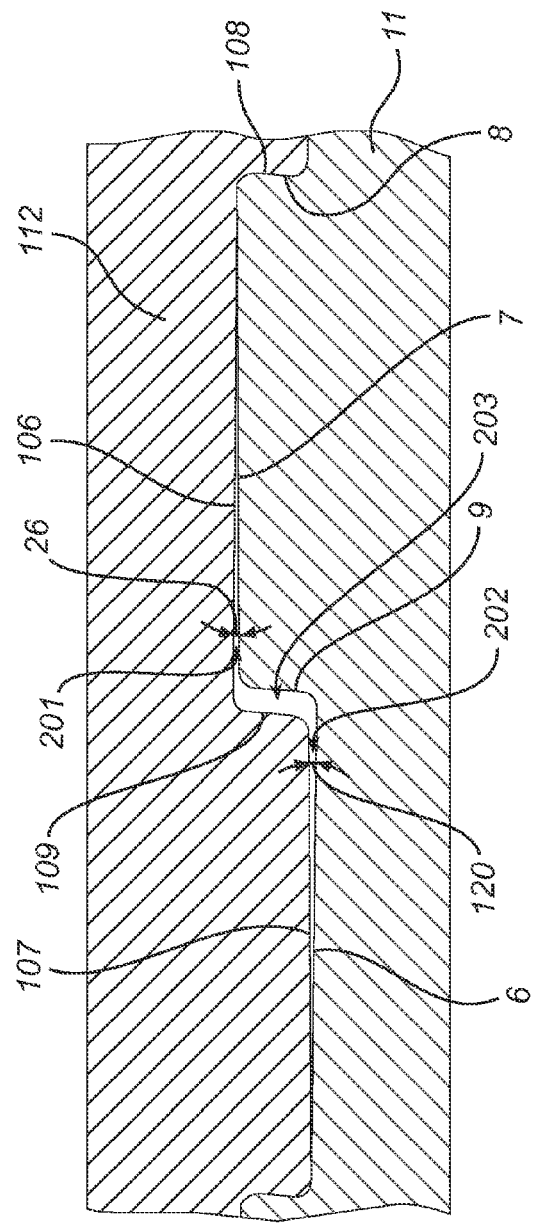

THREADED THIN-WALLED DRILL TUBE JOINT

CROSS REFERENCE TO RELATED APPLICATIONS

This application is a §371 National Stage Application of PCT International Application No. PCT/SE2010/050173, filed Feb. 16, 2010, and claims priority under 35 U.S.C. §119 and/or §365 to Swedish Application No. 0900388-0, filed Mar. 26, 2009, the disclosures of both of which are incorporated herein in their entirety by reference.

FIELD OF THE INVENTION

This disclosure relates to joints for drill tubes, and in particular threaded joints for thin-walled drill tubes.

BACKGROUND

A joint for a drill tube transfers the torque power from one tube part to another. Because of a thinner wall thickness, the joint is generally weaker than the rest of the tube. At a certain drilling depth, the tube gets so long that the weight becomes greater than the desired drilling thrust. To keep the desired drilling thrust at the drill bit end of the tube, an increased pullback tension load is required at the opposite end of the drill tube. Therefore, when drilling deep, the joint needs a high tension load capacity.

A threaded joint may be modified to make it stronger. One such solution is presented in U.S. Pat. No. 5,788,401, wherein a thin walled drill tube joint with a negative thread pressure flank is disclosed. The problem is solved with a negative pressure flank of 7.5° to 15° relative to a direction perpendicular to the central axis to provide for lower stress states. Further, the threaded section of the joint tapers along the axial length of the joint, with kept thread depth. A problem with this solution is that such tube joint is difficult to manufacture.

Hence, there is a need for an improved drill tube joint.

SUMMARY OF THE INVENTION

It is an object of the present invention to provide an improved joint for a thin-walled drill tube. One particular object is to provide a joint that is strong yet easy to manufacture. The joint comprises a male part and a female part, which are connectable to each other by a thread connection.

According to a first aspect, a member of a joint in a thin-walled drill tube is provided, presenting a central axis and comprising a thread for forming a screw joint, wherein the thread presents a thread bottom, a thread top, a pressure flank and a clearance flank, characterized in that the pressure flank presents a portion having a negative angle less than 7.5°, but larger than 0°, relative to a direction perpendicular to the central axis.

When discussing angles of flanks and thread tops, it is understood that it is the main angle of the respective surface that is intended, and that any radii at edges of the respective surface should be disregarded.

The strength of the joint depends partly on the wall thickness of the joint parts. A shallow thread depth enables a greater wall thickness of the joint parts. With such solution, the thread depth may be reduced and the wall thickness increased, providing a stronger joint for deeper drilling. A tensile increase from 424000 N to 479000 is possible, which translates into about 300 m further drilling.

A negative angle is defined as an angle creating an undercut flank surface. By thin-walled drill tube, it is meant a tube with a wall thickness, excluding the thread, of about 3 to 6.4 mm, about 3 to 5.6 mm, or about 3 to 4.2 mm.

In further embodiments, the negative angle of the pressure flank portion may be about 1° to 6°, about 2° to 5°, about 4° to 5°, or about 5° relative to the direction perpendicular to the central axis.

In order to enable a reduced thread depth for increased wall thickness, the material of the member must be strong enough to manage the increased tension load on the thread due to reduced depth. One embodiment presents a joint member made of substantially through-hardened steel. When the steel is through-hardened and not only surface-hardened, no heat affected zone that can cause breakage of the thread top is created.

The thread depth, defined as the radial distance between the thread bottom and the thread top, can, in further embodiments, be about 0.5 to 0.8 mm, about 0.5 to 0.7 mm, or about 0.5 to 0.6 mm.

To enable more efficient use of the thread depth for more effective power transmission and better tension load capacity, in one embodiment, the material thickness at least one of the thread bottom and the thread top may taper towards an end portion of the member. This means that the thread depth is not constant along the surface of the member over which the thread extends. This solution may, when the male member is connected to a female member, result in a tapering clearance between the male and female members. A further advantage with this effect is that more space is offered for dirt and grease between the threads, which otherwise could cause disturbances and reduced tension load capacity in the connection.

In a further embodiment, the thread bottom may be substantially parallel with the central axis and the material thickness of the thread top tapers towards the end portion of the member.

The clearance flank of the thread may in one embodiment present a portion with an angle less than 45° relative to the direction perpendicular to the central axis.

In a further embodiment, the clearance flank of the thread may present a portion with an angle that is different at different sections of the thread. A rather large angle on a first thread section located close to the end portion of the member may facilitate the assembly of the male member with a female member. The clearance flank may then in one embodiment present a portion with an angle of about 10° to 40°, about 20° to 35°, or about 30° relative to the direction perpendicular to the central axis.

The first thread section may be located closer to an end portion of the member than a second thread section. The second section may present a clearance flank portion with an angle of about 0° to 15°, about 1° to 10°, or about 5° relative to the direction perpendicular to the central axis. The clearance flank angles of the different thread sections may be combined in different embodiments according to Table 1. X indicates explicit disclosure of a first and second section clearance flank angle combination.

TABLE 1

|  | 0° to 15° | 1° to 10° | 5° |
|---|---|---|---|
| 10° to 40° | X | X | X |
| 20° to 35° | X | X | X |
| 30° | X | X | X |

A thread pitch of the member may be about 0.8 to 1.6 threads per centimeter, about 0.8 to 1.2 threads per centimeter, or about 1 thread per centimeter.

At least one of the pressure flank and the clearance flank may be connected to the thread bottom via a radius of more than about 0.10 mm or more than about 0.15 mm.

At least one of the pressure flank and the clearance flank may be connected to the thread top via a radius of more than about 0.10 mm or more than about 0.15 mm or more than about 0.20 mm.

The member may be a male member, wherein the thread extends along an outer portion of the member. In the alternative, the member may be a female member, wherein the thread extends along an inner portion of the member.

The female member presents in different embodiments substantially the same features as the male member. The two members may have the same pressure flank and clearance flank angles, thread depth and material.

In one embodiment, the thread top may, for a male member, taper with an angle of about 0.2° to 0.6°, about 0.3° to 0.5°, about 0.3° to 0.4°, or about 0.34° relative the central axis. In another embodiment, the material thickness of the thread top may, for a male member, taper with an angle of about 1.7° to 2.5°, or about 2° to 2.5° relative the central axis.

In one embodiment, the material thickness of the thread top may, for a female member taper with an angle of about 0.2° to 0.6°, about 0.2° to 0.4°, about 0.2° to 0.3°, or about 0.28° relative to the central axis. At the same time the thread bottom may be substantially parallel with the central axis.

A second aspect provides a joint system for a drill tube comprising a male member and a female member according to any of the previous presented embodiments. The joint system may, in one embodiment, present a tapering clearance between a thread top of one of the members and a thread bottom of the other one of the members. This feature presents the effect that a maximum part of the thread depth is used when the pressure flanks of the two members are in connection. It also allows more space for dirt and grease in the thread connection. In practice, the thread depth may vary and/or the material thickness at the thread bottom may vary.

In a further embodiment of the invention the tapering clearance is present over at least two juxtaposed threads. With as much connection surface as possible between the pressure flanks of the two members as possible, the more the thread depth can be reduced, enabling increased wall thickness, with kept tension load capacity of the joint. Therefore it is an advantage if all threads have a tapering clearance at the connection between the two members.

According to a third aspect, there is provided a thin-walled tube drill system, comprising a joint system as described above, wherein the male member is arranged on a first thin-walled drill tube and the female member is arranged on a second thin-walled drill tube.

According to a fourth aspect, there is provided a male or female member of a joint for a drill tube, presenting a central axis and comprising a thread for forming a screw joint, wherein the thread presents a thread bottom, a thread top, a pressure flank and a clearance flank, wherein a material thickness at least one of the thread bottom and the thread top tapers towards an end portion of the member.

According to a fifth aspect, there is provided a male or female member of a joint for a drill tube, presenting a central axis and comprising a thread for forming a screw joint, wherein the thread presents a thread bottom, a thread top, a pressure flank and a clearance flank, at least one of the pressure flank and the clearance flank is connected to the thread bottom via a radius of about 0.15 mm.

According to a sixth aspect, there is provided a male or female member of a joint for a drill tube, presenting a central axis and comprising a thread for forming a screw joint, wherein the thread presents a thread bottom, a thread top, a pressure flank and a clearance flank, at least one of the pressure flank and the clearance flank is connected to the thread top via a radius of about 0.20 mm.

It is understood that each of the fourth to sixth aspects may be used in combination with any embodiment under the first or second aspects, or independently thereof.

BRIEF DESCRIPTION OF THE DRAWINGS

In the following, an embodiment will be described in more detail with reference to the accompanying drawings.

FIG. 2 is a cross-sectional view of one half of the joint with a male member and a female member.

FIG. 3 is a cross-sectional detail view of the connection between a male and female member thread.

DETAILED DESCRIPTION

Figure 1A:
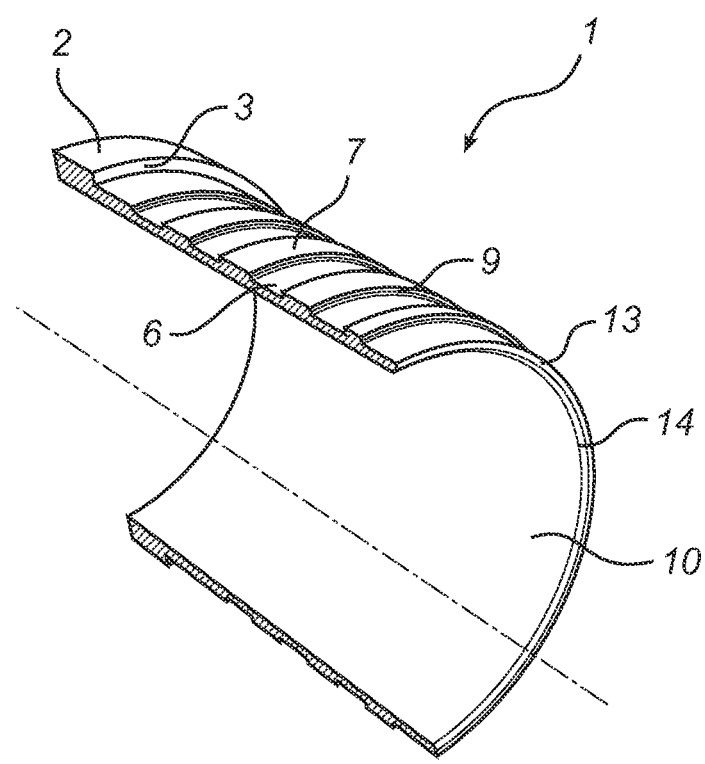
FIG. 1a is a perspective cross-sectional view of a male member.
Figure 1B:
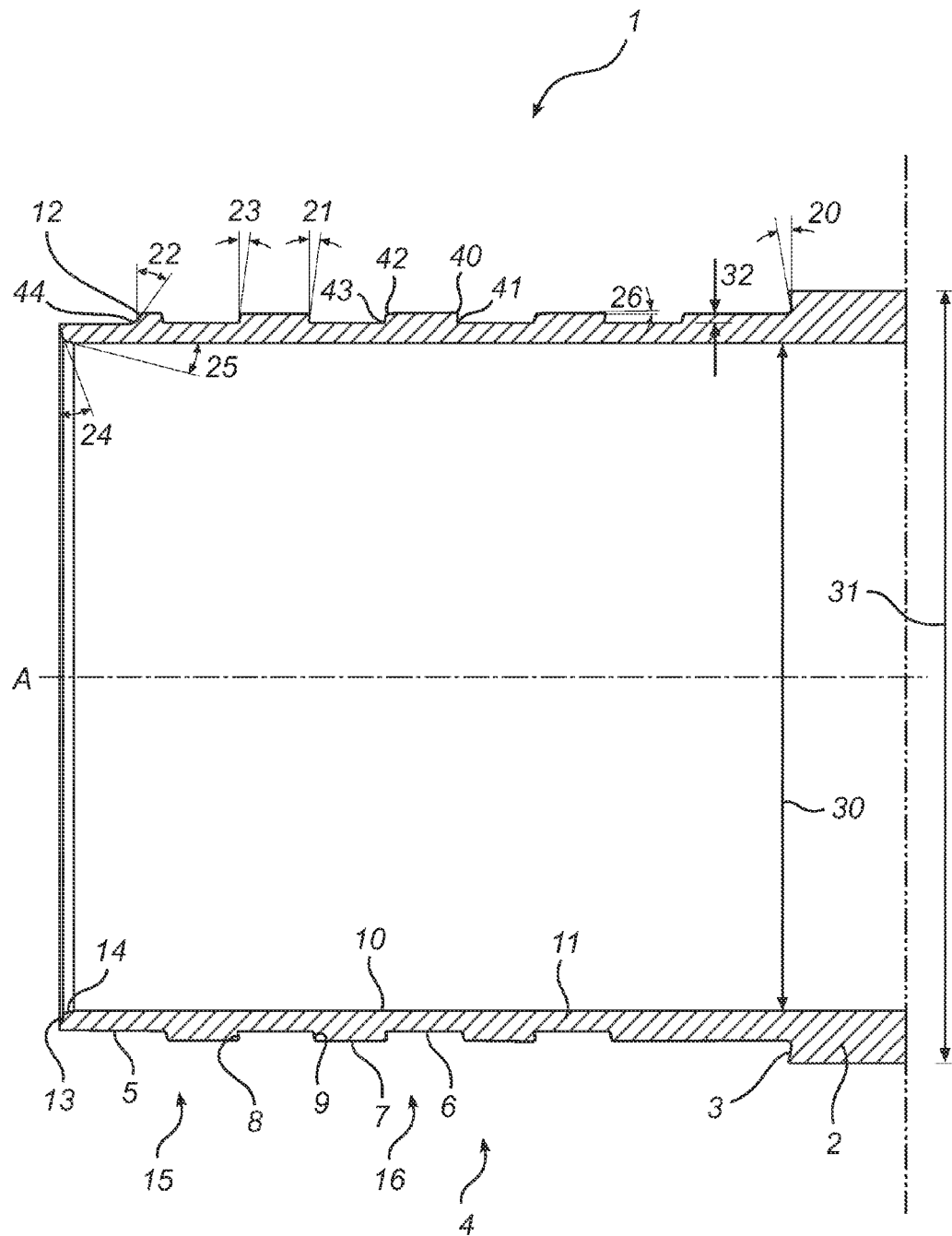
FIG. 1b is a cross-sectional view of a male member.

With reference to FIGS. 1a and 1b, a male member 1 of a joint for a drill tube is shown. The inner diameter 30 of the tubular tube and joint, as well as the outer diameter 31, may be specified for an industrial standard. A base portion 2 of the cylindrical member has the same outer diameter 31 as the drill tube, and a base shoulder 3 connects the base portion 2 with the outer portion of the member that is provided with a thread 4. The thread extends along the axial length of the member 1, and ends at an end portion 5.

The thread 4 presents a thread bottom 6, a thread top 7, a pressure flank 8 and a clearance flank 9. The thread bottom 6 is defined as the part of the thread with the shortest radial distance from the central axis A. The part with longer radial distance from the central axis is the thread top 7. The greatest radial distance between the thread bottom 6 and the thread top 7 defines the thread depth 32. An inner cylindrical surface 10 of the member 1 defines, together with the thread bottom 6, the wall 11 of the member 1.

The base shoulder 3 is undercut and tapers towards the threaded portion of the member with an angle 20 of about 15° relative to a direction perpendicular to the central axis A. The pressure flank 8 is the flank of the thread 4 facing the base portion 2. The pressure flank 8 has an undercut surface with a negative angle 21 of about 5° relative to a direction perpendicular to the central axis A. The clearance flank 9 faces towards the end portion 5. The clearance flank 9 may have different angles at different sections of the thread 4. A first section 15 of the thread is provided closest to the end portion 5 of the member. That first section 15 may present an entrance clearance flank 12 with a positive angle 22 of about 30° relative to a direction perpendicular to the central axis A. In a second section 16 of the thread, the clearance flank 9 may present a positive angle 23 of about 5° relative to a direction perpendicular to the central axis A. A larger angle in the first thread section 15 may facilitate the assembly of the male member 1 into a female member in a joint, and reduces the risk of damaging of the threads.

The member 1 and the member end portion 5, terminate at an end shoulder 13. The end shoulder 13 tapers with a negative angle 24 of about 15° relative to a direction perpendicular to the central axis A. The end shoulder is connected to the inner cylindrical surface 10 of the member via a chamfer 14 with an angle 25 of about 15° relative the central axis A.

The thread bottom 6 may be substantially parallel with the central axis A. The thread top 7 tapers towards the end portion 5 of the male member 1 with an angle 26 of about 0.34° relative the central axis A. This results in a non-constant thread thickness 32. To increase the strength in the joint, it is desirable to make the wall 11 as thick as possible, and therefore it is desirable to make the thread thickness 32 as shallow as possible. In this embodiment of the invention, the thread depth 32 may be about 0.5 to 0.7 mm.

The pressure flank 8 presents the angle 21. The pressure flank 8 is connected to the thread top 7 via a radius 40, which may be about 0.2 mm. The pressure flank is further connected to the thread bottom 6 via a radius 41, which may be about 0.15 mm. In the same way, the clearance flank 9 of the second thread section 16 may be connected to the thread top 7 via a radius 42, which may be about 0.2 mm, and connected to the thread bottom 6 via a radius 43, which may be about 0.15 mm. The entrance clearance flank 12 is connected to the end portion 5 via a radius 44, which may be about 0.4 mm. The different radii at the flanks have the effect that the loads on the connections are distributed over a larger area. The sizes of the radii may be adjusted for optimal effect. The radii also make it easier to achieve a tight connection surface between the flanks.

The joint system according to the invention comprises a male member 1 and a female member 101, wherein the male member comprises a thread extending along an outer portion of the member, and the female member 101 comprises a thread extending along an inner surface portion of the member. FIG. 2 shows the male member 1 in joint connection with the female member 101. The female member 101 presents corresponding parts as the male member 1 including a base portion 102, an end portion 103, a base shoulder 104, an end shoulder 105 and a threaded portion presenting a thread bottom 106, a thread top 107, a pressure flank 108, a clearance flank 109 and radii. The base shoulder 104 tapers towards the threaded portion of the female member 101 with a negative angle of about 15° relative to a direction perpendicular to the central axis A. The base shoulder 104 is connected to the jacket surface of the base portion 102 via a chamfer 110 of about 15° relative to the central axis A. The end portion 103 terminates at the end shoulder 105 that tapers with a negative angle of about 15° relative to a direction perpendicular to the central axis A, and is connected to an outer surface 111 of the female member. The pressure flank 108 and the clearance flank 109, present the same positive and negative angles as the corresponding angles for the male member 1.

The thread bottom 106 of the female member 101 may be substantially parallel with the central axis A, providing a constant wall thickness of the female member wall 112. The thread top 107 may taper towards the female member end portion 103 with an angle 120 of about 0.28° relative the central axis A. Therefore, the thread depth at the thread part axially closer to the base portion of each member may differ from the thread depth at the thread part axially closer to the end portion of each member.

The thread pitch of the male member 1 and the female member 101 respectively may be about 2.5 threads per inch.

In the joint connection between the male member 1 and the female member 101, the pressure flanks 8, 108 of the two members are in connection and provide the tension load capacity of the joint. The difference between the angles 26 and 120 of the two thread tops 7 and 107 and the two thread bottoms 6 and 106 creates, as seen in FIG. 3, tapering clearances 201, 202 between the female thread bottom 106 and the male thread top 7, and between the female thread top 107 and the male thread bottom 6. The thread bottoms 6, 106 may be substantially parallel with the central axis A. This feature provides a good and effective connection surface between the pressure flanks 8 and 108. Also, the radii 40, 41 connected to the pressure flanks help providing a more efficient connection surface. The tapering clearances 201, 202, together with the clearance 203 between the clearance flanks 9, 109, create space for grease and dirt in the thread. This has the positive effect that interference of grease and dirt on the pressure flank connection is reduced.

To enable the solution in this embodiment, with reduced thread depth and increased wall 11, 112 thickness, the material of the walls 11, 112 and the threads may be of through-hardened steel. With a material that is not through-hardened, for instance surface-hardened, there is a risk of weaker threads due to heat effected zones.

The invention claimed is:

1. A member of a joint in a thin-walled drill tube, presenting a central axis and comprising a thread for forming a screw joint, wherein the thread presents:
    a thread bottom,
    a thread top,
    a pressure flank and
    a clearance flank,
    wherein the pressure flank presents a portion having a negative angle less than 7.5°, but larger than 0°, relative to a direction perpendicular to the central axis, and
    wherein the thread includes a first section and a second section that present different clearance flank angles.

2. The member according to claim 1, wherein the negative angle is about 1° to 6°, about 2° to 5°, or about 4° to 5° relative to the direction perpendicular to the central axis.

3. The member according to claim 1, wherein the member is made of substantially through hardened steel.

4. The member according to claim 1, wherein a radial distance between the thread bottom and the thread top is about 0.5 to 0.8 mm, about 0.5 to 0.7 mm, or about 0.5 to 0.6 mm.

5. The member according to claim 1, wherein a material thickness at least at one of the thread bottom and the thread top tapers linearly towards an end portion of the member.

6. The member according to claim 5, wherein the thread bottom is substantially parallel with the central axis, and the material thickness of the thread top tapers linearly towards an end portion of the member.

7. The member according to claim 1, wherein a section of the thread presents a clearance flank portion with an angle less than 45° relative to the direction perpendicular to the central axis.

8. The member according to claim 1, wherein the first section is located closer to an end portion of the member than the second section, and presents a clearance flank portion with an angle of
    about 10° to 40°,
    about 20° to 35°, or
    about 30° relative to a direction perpendicular to the central axis, and the second section presents a clearance flank portion with an angle of
    about 0° to 15°, about 1° to 10, or about 5° relative to a direction perpendicular to the central axis.

9. The member according to claim 1, wherein a thread pitch is about 1.8 to 1.6 threads per centimeter, about 0.8 to 1.2 threads per centimeter, or about 1 thread per centimeter.

10. The member according to claim 1, wherein at least one of the pressure flank and the clearance flank is connected to the thread bottom via a radius of more than about 0.10 mm or more than about 0.15 mm.

11. The member according to claim 1, wherein at least one of the pressure flank and the clearance flank is connected to the thread top via a radius of more than about 0.10 mm or more than about 0.15 mm or more than about 0.20 mm.

12. The member according to claim 1, wherein the member is a male member, and the thread extends along an outer portion of the member.

13. The member according to claim 12, wherein the material thickness of the thread top tapers with an angle of about 1.7° to 2.5°, or about 2° to 2.5° relative the central axis.

14. The member according to claim 12, wherein the material thickness of the thread top tapers with an angle of about 0.2° to 0.6°, about 0.3° to 0.5°, about 0.3° to 0.4°, or about 0.34° relative the central axis.

15. The member according to claim 1, wherein the member is a female member, and the thread extends along an inner portion of the member.

16. The member according to claim 15, wherein the material thickness of the thread top tapers with an angle of about 0.2° to 0.6°, about 0.2° to 0.4°, about 0.2° to 0.3°, or about 0.28° relative the central axis.

17. A joint system for a drill tube, comprising
  a male member according to claim 12, and
  a female member comprising a second thread and the second thread extends along an inner portion of the female member,
  wherein the second thread presents a second thread bottom, a second thread top, a second pressure flank, and a second clearance flank and
  wherein the second pressure flank presents a second portion having a second negative angle less than 7.5°, but larger than 0°, relative to the direction perpendicular to the central axis.

18. The joint system according to claim 17, wherein a tapering clearance is presented between a thread top of one of said members and a thread bottom of the other one of said members.

19. The joint system according to claim 18, wherein the clearance is present over at least two juxtaposed threads.

20. A thin-walled tube drill system, comprising a joint system according to claim 17, wherein the male member is arranged on a first thin-walled drill tube and the female member is arranged on a second thin-walled drill tube.

21. The member according to claim 1, wherein a first section of the thread located closest to an end portion of the member has an entrance clearance flank with a first clearance angle that is positive and the first clearance angle is larger than a clearance angle in a second portion of the thread.

22. The member according to claim 21, wherein the first clearance angle is 10° to 40° relative to a direction perpendicular to the central axis and the clearance angle in the second portion of the thread is 0° to 15° relative to a direction perpendicular to the central axis.

23. A member of a joint in a thin-walled drill tube, presenting a central axis and comprising a thread for forming a screw joint, wherein the thread presents:
  a thread bottom,
  a thread top,
  a pressure flank and
  a clearance flank,
  wherein the pressure flank presents a portion having a negative angle, relative to a direction perpendicular to the central axis,
  wherein the thread presents a first section and a second section presenting different clearance flank angles,
  wherein the first section is located closer to an end portion of the member than the second section,
  wherein the first section presents a clearance flank portion with a first positive clearance angle, relative to a direction perpendicular to the central axis,
  wherein the second section presents a clearance flank portion with a second positive clearance angle, relative to a direction perpendicular to the central axis, and
  wherein the first clearance angle is larger than the second clearance angle.

* * * * *